(12) United States Patent
Prideaux et al.

(10) Patent No.: US 6,493,605 B1
(45) Date of Patent: Dec. 10, 2002

(54) METHOD AND APPARATUS FOR DISTRIBUTING FOOD PRODUCT BITS TO A PACKAGER, ESPECIALLY GELATIN-BASED PRODUCT BITS

(75) Inventors: Mark Prideaux, Marion; Ryan S. Willits, Iowa City, both of IA (US)

(73) Assignee: General Mills, Inc., Minneapolis, MN (US)

( * ) Notice: Subject to any disclaimer, the term of this patent is extended or adjusted under 35 U.S.C. 154(b) by 64 days.

(21) Appl. No.: 09/645,143

(22) Filed: Aug. 24, 2000

(51) Int. Cl.[7] .............................................. G06F 17/00
(52) U.S. Cl. .................. 700/240; 177/58; 177/180; 177/120; 193/15; 222/52
(58) Field of Search ................. 700/240, 231; 177/255.11, 58, 180, 120; 222/52, 55; 193/15, 17, 30

(56) References Cited

U.S. PATENT DOCUMENTS

| | | | | |
|---|---|---|---|---|
| 3,945,448 A | * | 3/1976 | Sellers | 177/25 |
| 4,418,771 A | * | 12/1983 | Henry et al. | 177/1 |
| 4,494,619 A | * | 1/1985 | Matsumo | 177/25 |
| 4,537,229 A | * | 8/1985 | Sashiki et al. | 141/83 |
| 4,607,713 A | * | 8/1986 | Nishi et al. | 177/25 |
| 4,844,190 A | * | 7/1989 | Mikami et al. | 177/25 |
| 4,963,302 A | * | 10/1990 | Heindl et al. | 264/40.4 |
| 5,054,652 A | * | 10/1991 | Oshima et al. | 222/55 |
| 5,098,524 A | * | 3/1992 | Antalfy et al. | 202/96 |
| 5,211,253 A | * | 5/1993 | Davis, Jr. | 177/25.18 |
| 5,677,517 A | * | 10/1997 | Berger | 177/162 |
| 5,765,655 A | * | 6/1998 | Tatsuoka | 177/25.18 |
| 6,046,411 A | * | 4/2000 | Kawanishi et al. | 177/25.17 |
| 6,206,059 B1 | * | 3/2001 | Maakad et al. | 141/346 |
| 6,271,484 B1 | * | 8/2001 | Tokutsu | 177/25.13 |
| 6,291,781 B1 | * | 9/2001 | Ohtani et al. | 177/25.17 |

* cited by examiner

Primary Examiner—Khoi H. Tran
(74) Attorney, Agent, or Firm—John A. O'Toole; Douglas J. Taylor; Timothy A. Czaja

(57) ABSTRACT

A method, apparatus, and system for separating and distributing food product bits provided in bulk form from a supply source to a packager. The present invention is particularly suitable for a combination weighing machine, such that the apparatus includes an inlet chute, a dispersion table, a driving mechanism, and a plurality of batch handling units. The inlet chute directs a stream of food product bits from the supply source to the dispersion table. The driving mechanism is coupled to the inlet chute for raising and lowering the inlet chute relative to the dispersion table, for example, in response to a controller-supplied signal. The plurality of batch handling units receive, accumulate, and selectively dispense charges of the food product bits from the dispersion table to the packager. During use, the inlet chute is directed to a lowered position to facilitate food product bit accumulation on the dispersion table. In this regard, the inlet chute can include a skirt forming a plurality of flexible tabs for effectuating food product bit accumulation. Over time, the food product bits are relatively uniformly dispersed on the dispersion table. The inlet chute is then maneuvered to a raised position, whereby the food product bits flow to all of the product batch handling units. With this method and apparatus, a wide variety of food product bits, including relatively sticky products such as gelatin-based fruit snacks, are consistently and optimally processed and packaged.

31 Claims, 8 Drawing Sheets

METHOD AND APPARATUS FOR DISTRIBUTING FOOD PRODUCT BITS TO A PACKAGER, ESPECIALLY GELATIN-BASED PRODUCT BITS

BACKGROUND OF THE INVENTION

The present invention relates to a combination weighing machine for distributing a flow of food product bits to a packaging device. More particularly, the invention is an improvement upon known combination weighing machines and methods that facilitates rapid, consistent distribution of relatively sticky food product bits, for example, gelatin-based food products.

A wide variety of food products are produced and provided to consumers as multiple pieces or bits, usually in "bite-size" form. Examples of this food product category include potato chips, pretzels, candy, cereal, etc. From a manufacturer's standpoint, a desired quantity or weight of the food product bits are packaged into a single bag, and then made available for purchase by consumers.

Mass production of packaged food product bits generally entails separating a bulk supply of the food product into small quantities (or "charges"), and subsequently delivering or distributing one or more of the charges to a packager in a controlled fashion. The packager, in turn, contains the charge(s) within an appropriately sized bag. To facilitate rapid packaging, the food product bits are not individually counted during the separation process, but instead are randomly grouped and weighed. Once a charge or charges of food product bits achieve or exceed a predetermined weight value, the quantity is distributed to the packager.

A widely employed device for separating a supply of food product bits by weight and distributing to a packager is a combination weighing machine. In general terms, a combination weighing machine includes an inlet chute, a dispersion table, a plurality of radial troughs, a plurality of pool hoppers, a plurality of weigh hoppers, and a discharge chute. The inlet chute directs the bulk supply of food product bits onto the dispersion table. The dispersion table is typically circular and generally convex so as to direct the food product bits (via gravity and auxiliary vibration) to the radial troughs located about a perimeter thereof. The radial troughs, in turn, direct the food product bits to respective ones of the pool hoppers. The food product bits accumulate within the various pool hoppers. The weigh hoppers are associated with respective ones of the pool hoppers. When signaled by a controller, a pool hopper discharges (i.e., gravity feeds) its accumulated food product bits into the associated weigh hopper. The food products bits (or charge) contained within each weigh hopper are weighed. Based upon predefined package weight specifications, the controller selects an optimum combination of weigh hoppers for product discharge. For example, where the pre-selected package weight is to be 8 ounces, the controller may sense a food product bit weight of 2 ounces in a first weigh hopper, 2.5 ounces in a second weigh hopper, and 3.5 ounces in a third weigh hopper. Because this combination satisfies the predefined specifications, the controller selects and causes the first, second and third weigh hoppers to discharge the accumulated food product bit charges to the discharge chute, and thus to the packager. Once emptied, the selected weigh hoppers are closed and the food product bits that have accumulated within the associated pool hoppers are once again gravity fed into the respective weigh hoppers. Thus, by providing a relatively large number of pool/weigh hoppers, a virtually continuous supply of appropriately weighted food product bits is available and can be provided to the packager.

As should be evident from the above discussion, the rapid cycle time of a combination weighing machine is premised on a relatively uniform supply of food product bits to all of the radial troughs, and thus, all of the pool and weigh hoppers. In this regard, by forming the dispersion table to assume a convex, circular shape, relatively uniform distribution to the radial troughs is normally realized. However, inherent characteristics of certain food products and/or the operation environment may impede desired uniform distribution from the dispersion table. For example, gelatin-based food product items, such as fruit snack bits, tend to be relatively tacky or sticky. This is especially true in an elevated temperature and/or humidity operating environment. This adhesive-like characteristic causes the individual bits to adhere or stick to one another, as well as to the various surfaces comprising the combination weighing machine. Due to this relatively sticky attribute, the gelatin-based food product bits may not be able to "naturally" achieve uniform distribution from the dispersion table. Instead, groupings of two or more adhered bits will be directed to a single one of the radial troughs. Additionally, because the sticky food product bits are not uniformly flowable, the food product bits may consistently flow to only a few of the radial troughs. Regardless of the cause, when the food product bits are not relatively uniformly or evenly distributed by the dispersion table to all of the radial troughs, an available cycle time of the combination weighing machine is negatively affected. That is to say, where the controller only has a few of the available weigh hoppers to select from, delays in food product bit accumulation will be experienced, thereby causing the combination weighing machine to operate less than optimally.

Combination weighing machines continue to be highly viable devices for use in the mass production of packaged food product bits. Certain deficiencies associated with particular food product items (such as inherently tacky or sticky products) have been identified, yet remain unresolved. Therefore, a need exists for a combination weighing machine, and related system and method, configured to optimally process a wide variety of food product items, including gelatin-based food product bits.

SUMMARY OF THE INVENTION

One aspect of the present invention relates to an apparatus for separating and distributing food product bits provided in bulk form from a supply source to a packager. The apparatus includes an inlet chute, a dispersion table, a driving mechanism, a plurality of radial troughs, a plurality of pool hoppers, a plurality of weigh hoppers and a discharge chute. The inlet chute is provided to receive a stream of food product bits and defines an upstream end and a downstream end. The dispersion table is positioned below the downstream end of the inlet chute. The driving mechanism is coupled to the inlet chute. In this regard, the driving mechanism is configured to selectively raise and lower the inlet chute relative to the dispersion table. The plurality of radial troughs are equidistantly spaced along a perimeter of the dispersion table for receiving food product bits from the dispersion table. The plurality of pool hoppers are associated with respective ones of the plurality of radial troughs. To this end, the pool hoppers accumulate food product bits delivered by the respective radial troughs. The plurality of weigh hoppers are similarly associated with respective ones of the plurality of pool hoppers. The weigh hoppers accumulate and weigh food product bits delivered from the pool hopper.

Finally, the discharge chute is associated with the plurality of weigh hoppers and is provided to distribute food product bits from the weigh hoppers to the packager.

During use, the driving mechanism maneuvers the inlet chute to a lowered position whereby food product bits delivered via the inlet chute are forced to accumulate on the dispersion table. In one preferred embodiment, the inlet chute includes a skirt having flexible tabs extending from the downstream end for promoting food product bit accumulation in the lowered position. Over time, the so-accumulated food product bits will distribute themselves over a substantial entirety of the dispersion table, especially adjacent a perimeter thereof. Following this accumulation, the driving mechanism raises the inlet chute, thereby releasing the food product bits from the dispersion table. Because the food product bits are effectively forced to cover virtually an entire perimeter or circumference of the dispersion table, each of the radial troughs will receive at least some of the food product bits. A remainder of the apparatus then operates in accordance with the known combination weighing devices, whereby food product bits supplied to the weigh hoppers, via the pool hoppers and radial troughs, are selectively distributed to the discharge chute, and thus the packager.

Another aspect of the present invention relates to a food product bit distribution system. The system includes an inlet chute, a dispersion table, product batch handling units, a discharge chute, and a controller. The inlet chute receives a stream of food product bits and defines an upstream end and a downstream end. The dispersion table is positioned below the inlet chute to receive food product bits therefrom. In this regard, the inlet chute is vertically moveable relative to the dispersion table. The product batch handling units receive, accumulate, and selectively dispense food product bits from the dispersion table. The discharge chute directs food product bit from the product batch handling units to a packager. Finally, the controller controls a vertical position of the downstream end of the inlet chute relative to the dispersion table. In this regard, the controller maneuvers the inlet chute between a lowered position in which distribution of food product bits from the dispersion table are impeded, and raised position in which food product bits flow freely from the dispersion table. With this configuration, during operation, the controller places the inlet chute in the lowered position to facilitate or force food product bit accumulation on the dispersion table. This forced accumulation results in a relatively uniform distribution of the food product bits along the dispersion table. Subsequently, the controller maneuvers the inlet chute to the raised position, such that the food product bits flow to each of the product batch handling units. In one preferred embodiment, a conveyer supplies the stream of food product bits to the inlet chute and the controller further controls activation/deactivation of the conveyor based upon a vertical position of the inlet chute relative to the dispersion table. In another preferred embodiment, a weight sensor is associated with the dispersion table for sensing a weight of food product bits on the dispersion table, and the controller dictates a position of the inlet chute based upon a weight of the food product bits on the dispersion table.

Yet another aspect of the present invention relates to a method of distributing a stream of food product bits to a packager with a product handler. In this regard, the product handler includes an inlet chute, a dispersion table, a plurality of batch handling units, and a discharge chute. The inlet chute receives the stream of food product bits. The dispersion table is positioned below the inlet chute. The plurality of batch handling units receive, accumulate, weigh, and selectively dispense food product bits from the dispersion table. Finally, the discharge chute directs food product bits from the batch handling units to the packager. With this in mind, the method includes movably associating the inlet chute relative to the dispersion table such that the inlet chute is movable between a lowered position and a raised position. In the lowered position, dispersion of food product bits from the dispersion table is impeded. Conversely, in the raised position, the food product bits are freely released from the dispersion table. The inlet chute is maneuvered to the lowered position. Food product bits are then accumulated on the dispersion table. The inlet chute is then maneuvered to the raised position so as to release the food product bits. Finally, the food product bits are selectively processed through the batch handling units and the discharge chute and directed to the packager. In one preferred embodiment, the inlet chute is maintained in the lowered position until a predetermined food product bit weight on the dispersion table is achieved.

DESCRIPTION OF THE PREFERRED EMBODIMENTS

Figure 1:
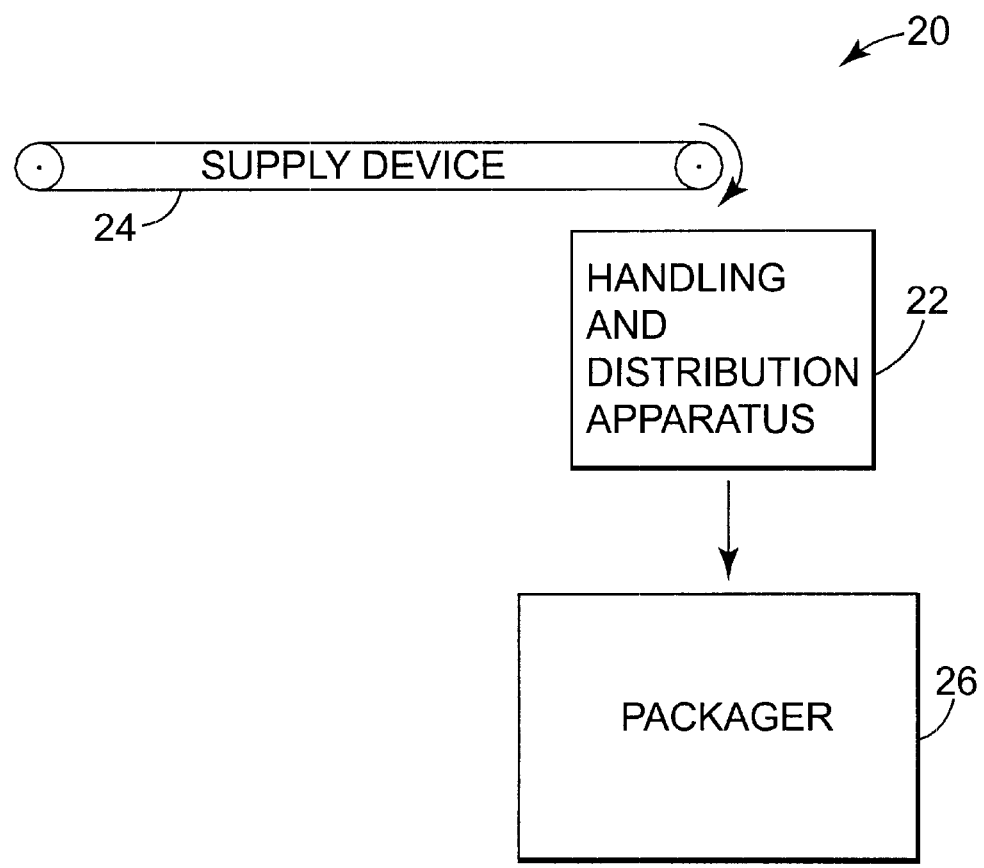
FIG. 1 is a block diagram of a product packaging system.

FIG. 1 depicts, in block form, a food packaging system 20 including a product separation and distribution apparatus 22 in accordance with the present invention. In addition to the separation and distribution apparatus 22 (described in greater detail below), the system 20 includes a product supply device 24 and a packager 26. In general terms, the supply device 24 provides a stream of food product bits (not shown) to the product separation and distribution apparatus 22. The separation and distribution apparatus 22, in turn, separates the food product bits into small, discrete quantities. More particularly, the separation and distribution apparatus 22 separates, weighs, and temporarily stores relatively small quantities of the food product bits. Based upon predetermined packaged weight parameters, the separation and distribution apparatus 22 selectively dispenses an individual charge or a combination of individual charges of the food product bits to the packager 26 for subsequent packaging. As is known in the art, the above-described packaging system 20 can readily handle and package a wide variety of types of food product bits, including potato chips, pretzels, candies, etc. As described in greater detail below, the packaging system 20, and in particular the product separation and distribution apparatus 22, is designed to optimally process a relatively sticky type of food product bits, especially gelatin-based food products such as fruit snacks.

The supply device 24 is depicted generally in FIG. 1 as being a motorized conveyor. Conveyors are well known in the art, and can assume a wide variety of configurations and lengths. Alternatively, the supply device 24 can be something other than a conveyor, for example, a supply bin or hopper. Regardless, the supply device 24 is configured to supply a stream of food product bits (not shown) to the product handling and distributing apparatus 22 in a controlled fashion. That is to say, the supply device 24 is provided with the ability to initiate and stop the flow of food product bits, such as by activation and deactivation of a conveyor motor (not shown).

The packager 26 can similarly assume a wide variety of forms known in the art. In one preferred embodiment, the packager 26 is a high speed, vertical form fill and seal bag maker. Acceptable bag makers are available, for example, under the trade name ROBAG® from TNA of Chesterhill, Australia. Alternatively, other known packagers can be employed.

Figure 2:
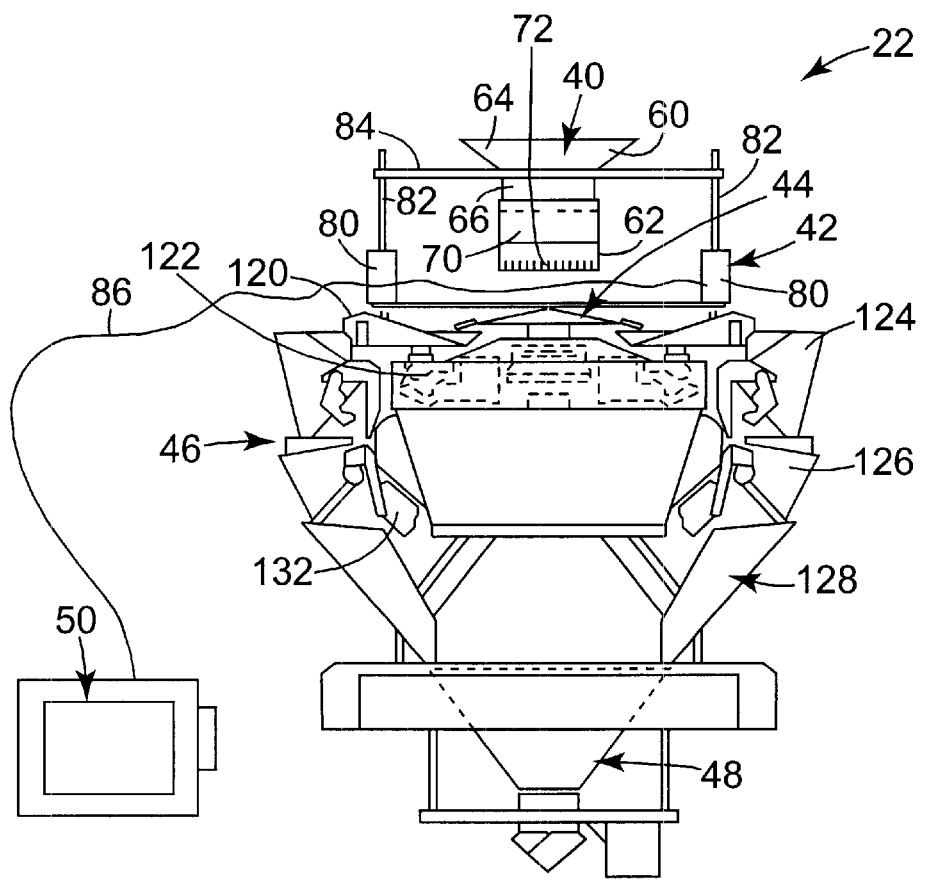
FIG. 2 is a schematic, side view of a separation and distribution apparatus portion of the system of FIG. 1 in accordance with the present invention.

The product separation and distribution apparatus 22 is preferably a combination weighing machine, and is depicted schematically in FIG. 2. The apparatus 22 includes an inlet chute 40, a driving mechanism 42, a dispersion table 44, a plurality of product batch handling units 46, a discharge chute 48, and a controller 50. Various components of the apparatus 22 are described in greater detail below. Generally speaking, however, the inlet chute 40 is positioned to receive, via gravity, food product bits (not shown) from the supply device 24 (FIG. 1). The dispersion table 44 is positioned below the inlet chute 40. In this regard, the driving mechanism 42 dictates a vertical position of the inlet chute 40 relative to the dispersion table 44. The plurality of product batch handling units 46 are radially positioned about a perimeter of the dispersion table 44. The product batch handling units 46 receive food product bits (not shown) from the dispersion table 44 and, after subsequent processing, deliver batch quantities of the food product bits to the discharge chute 48. The discharge chute 48 gravity feeds the food product bits 48 to the packager 26 (shown generally in FIG. 2). Finally, the controller 50 is electrically connected to various components of the apparatus 22, and controls operation thereof as described in greater detail below.

Figure 3:
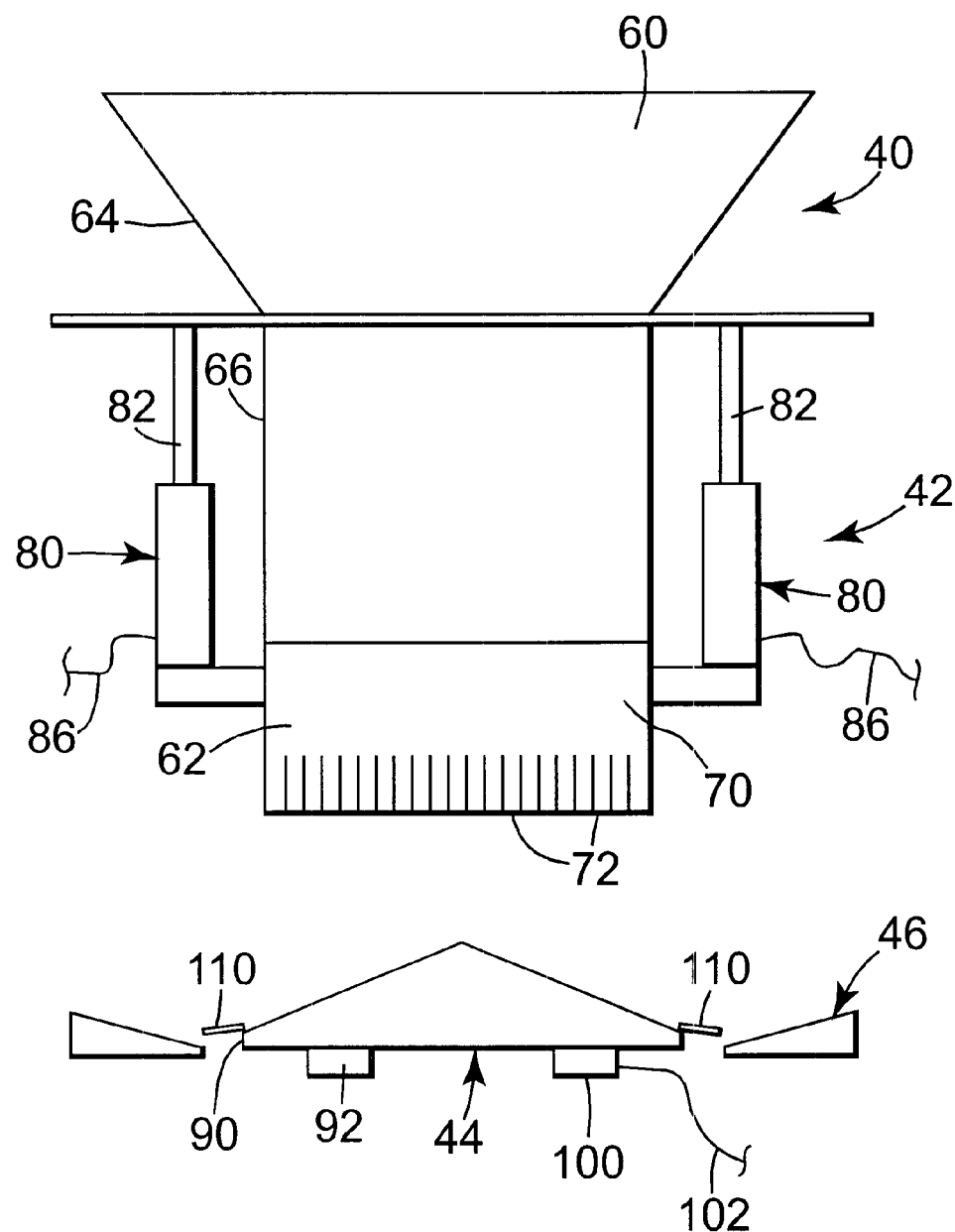
FIG. 3 is an enlarged view of a portion of FIG. 2.

The inlet chute 40, the driving mechanism 42, the dispersion table 44 along with related components, and a portion of the product batch handling units 46 are shown in greater detail in FIG. 3. The inlet chute 40 defines an upstream end 60 and a downstream end 62, and preferably includes a funnel 64 and a throat 66. As previously described, the inlet chute 40 receives food product bits (not shown) at the upstream end 60 and, via gravity, directs the food product bits from the funnel 64 to the throat 66. In this regard, the throat 66 is preferably tubular to provide a uniform guide path for the food product bits.

In one preferred embodiment, the inlet chute 40 further includes a skirt 70 extending downwardly (relative to the upstream end 60) at the downstream end 62. The skirt 70 is secured to the throat 66 by a clamp (not shown) or other known attachment device(s). The skirt 70 corresponds with the tubular shape of the throat 66 and preferably defines a plurality of flexible tabs 72. As described in greater detail below, the plurality of tabs 72 are formed (in terms of material and thickness) to be sufficiently flexible or compliant so as to not damage other components of the apparatus 22, yet have sufficient rigidity to engage, and prevent movement of, food product bits (not shown) otherwise disposed upon the dispersion table 44. For example, in one preferred embodiment, the skirt 70 including the flexible tab 72, is formed from rubber having a thickness in the range of 0.5–5 mm, most preferably approximately 2 mm, with each tab 72 having a length in the range of 5–25 mm, most preferably approximately 15 mm. Alternatively, other relatively rigid yet compliant materials, such as plastic, along with other dimensional characteristics are equally acceptable. In another alternative embodiment, the skirt 70 can be formed without the flexible tabs 72, yet still serve to retain food product bits on the dispersion table 44 when properly positioned.

The driving mechanism 42 movably maintains the inlet chute 40 above the dispersion table 44. More particularly, the driving mechanism 42 vertically maneuvers the inlet chute 40 relative to the dispersion table 44. As described below, the driving mechanism 42 can position and maneuver the inlet chute 40 between a raised position (as shown in FIG. 3) and a lowered position. In the raised position, the downstream end 62 of the inlet chute 40 is spaced from the dispersion table 44. Conversely, in the lowered position, the downstream end 62 of the inlet chute 40 contacts or is slightly spaced from (on the order of 5 mm) the dispersion table 44. To this end, by forming the skirt 70, including the flexible tabs 72, from a compliant material, the dispersion table 44 will not be damaged by the inlet chute 40 in the lowered position.

In one preferred embodiment, the driving mechanism 42 includes a pair of cylinders 80 each including an extendable piston 82. As shown in FIG. 3, the pistons 82 are secured to a frame 84 that in turn is connected to the inlet chute 40. With this configuration, retraction or extension of the pistons 82 is transferred to the inlet chute 40 via the frame 84. In this regard, the controller 50 communicates with the cylinders 80 via lines 86 so as to dictate piston extension. For example, where the cylinders 80 are pneumatically operated, the controller 50 can be connected to a fluid source (not shown) that otherwise causes extension and retraction of the pistons 82. Alternatively, a variety of other known devices can be employed for the driving mechanism 42. For example, the throat 66 of the inlet chute 40 can assume a telescopic configuration such that the driving mechanism 42 vertically maneuvers the throat 66 relative to the dispersion table 44 while the funnel 64 remains stationary. Alternatively, a motorized/gear train device can be employed to vertically maneuver the inlet chute 40 relative to the dispersion table 44.

The dispersion table 44 is of a type commonly employed with combination weighing devices. In this regard, the dispersion table 44 preferably defines a circular perimeter 90 and has a generally convex shape. With this configuration, the dispersion table 44 naturally guides or conveys food product bits (not shown) from a center of the dispersion table 44 to the perimeter 90 via gravity. As is known in the art, a vibration unit 92 is preferably associated with the dispersion table 44 to enhance more rapid conveyance of food product bits.

In one preferred embodiment, a weighing device or load cell 100 (depicted in block form) is also associated with the dispersion table 44. The weighing device is of a type known in the art and detects a weight of food product bits (not shown) otherwise disposed upon the dispersion table 44. The so-detected weight is signaled to the controller 50 via line 102. In one preferred embodiment, the weighing device 100 is a Dataweigh SIGMA series available from Yamoto of Japan.

In yet another preferred embodiment, the dispersion table 44 further includes a plurality of flexible fingers 110 extending from the perimeter 90. The fingers 110 assist in guiding food product bits (not shown) to the handling units 46. The flexible fingers 110 are preferably formed from a compliant yet relatively rigid material, such as rubber, that will not damage the metal-based components of the apparatus 22, but will not overtly deflect when in contact with the food product bits. Other compliant materials, such as plastic, are also acceptable.

Returning to FIG. 2, as known in the combination weighing machine art, the product batch handling units 46 each preferably include a radial trough 120, a radial feeder 122, a pool hopper 124, a weigh hopper 126, and a collection chute 128. Each of the radial troughs 120 are positioned along the perimeter 90 of the dispersion table 44. In this regard, the radial feeder 122 vibrates the radial trough 120 to facilitate movement or conveyance of food product bits (not shown) along the radial troughs 120. Each of the pool hoppers 124 are associated with a respective one of the radial troughs 120. The pool hoppers 124 accumulate and periodically dispense, when signaled by the controller 50, food product bits from the radial troughs 120. Similarly, the weigh hoppers 126 are associated with a respective one of the pool hoppers 124. The weigh hoppers 126 receive, weigh, and selectively dispense food product bits from the pool hoppers 124. In this regard, a scale or load cell (not shown) is associated with each of the weigh hoppers 126 for determining food product bit weight. Further, each of the weigh hoppers 126 includes a gate 132 controlled by the controller 50. When signaled by the controller 50, the gate 132 is open to dispense food product bits from within the weigh hopper to an associated one of the collection chutes 128. Finally, the collection chutes 128 direct the food product bits to the discharge chute 48.

Figure 4:
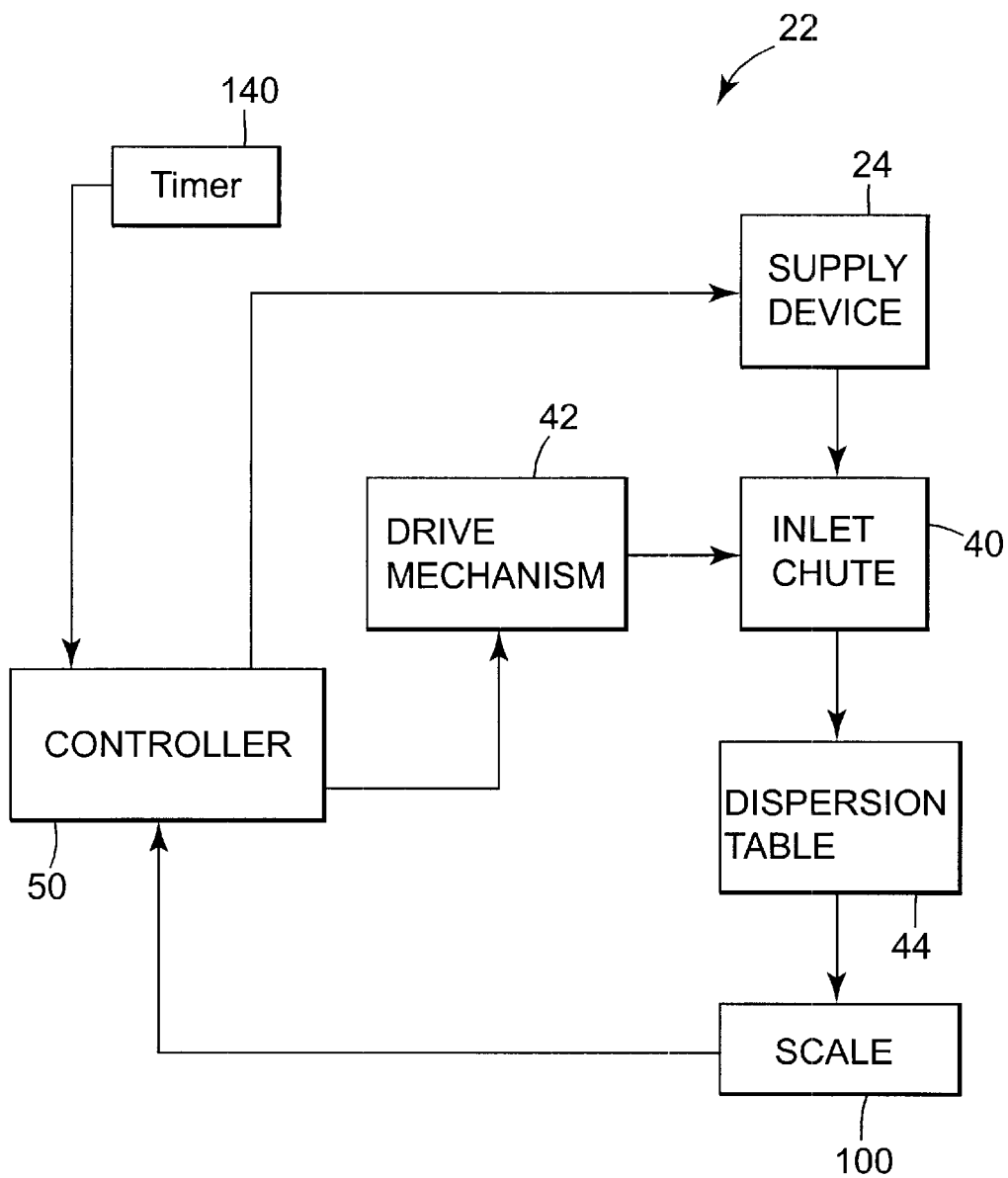
FIG. 4 is a block diagram representing a control system in accordance with the present invention for the apparatus of FIG. 2.

As previously described the controller 50 serves to monitor and control processing of food product bits through the apparatus 22, thereby serving as an operating system. In this regard, FIG. 4 depicts, in block form, the operating system including a relationship of the controller 50 relative to other components. The controller 50 is electrically connected to, and controls activation/deactivation of, the supply device 24 (such as the conveyor depicted in FIG. 1). Similarly, the controller 50 is electrically connected to, and controls operation of, the driving mechanism 42. Also, the controller 50 is electrically connected to, and receives signals from, the load cell 100 associated with the dispersion table 44. Finally, in one preferred embodiment, the controller 50 is electrically connected to, and receives signals from, a timer shown generally at 140. Although not specifically shown in FIG. 4, the controller 50 can further be electrically connected to, and control operation of, the pool hoppers 124 (FIG. 2) and the weigh hoppers 126 (FIG. 2) as previously described. Regardless, the controller 50 can synchronize operations of the supply device 24 and the product separation and distribution apparatus 22, including the inlet chute 40.

Figure 5A:
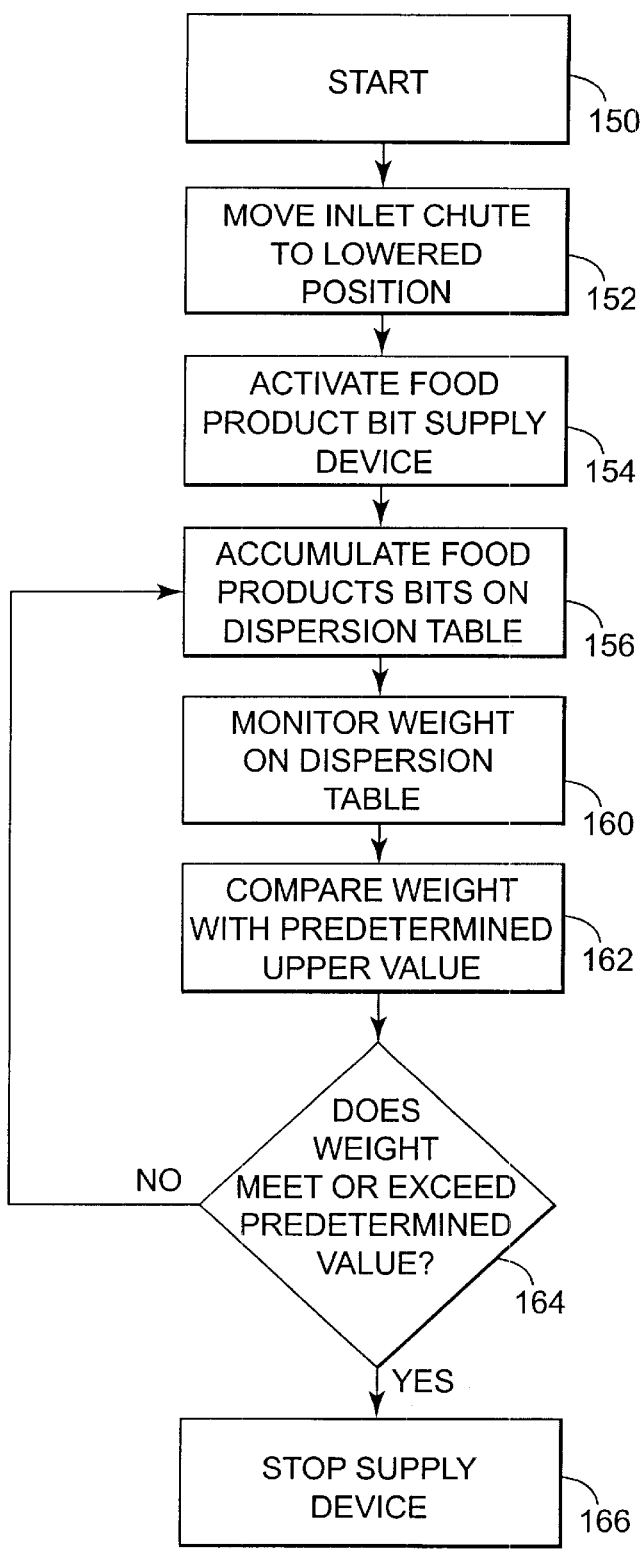
FIGS. 5A and 5B is a flow chart of the control carried out by the control system of FIG. 4.
Figure 5B:
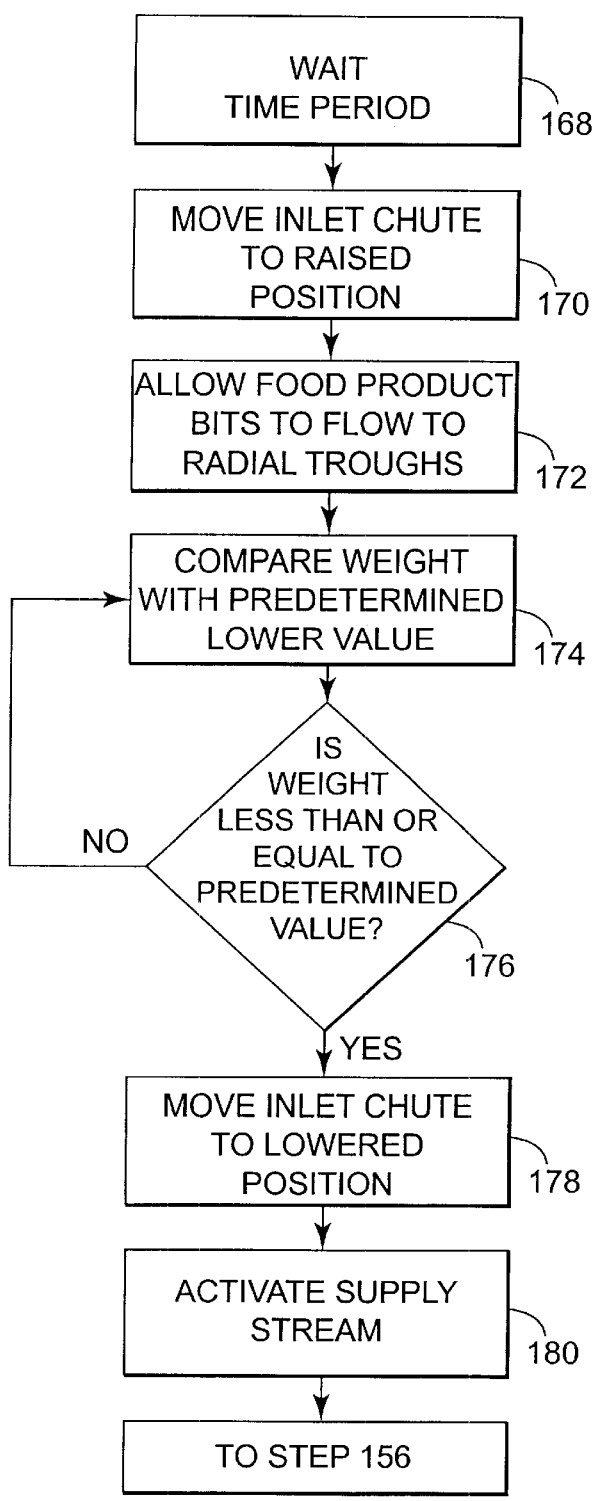

The control carried out by the controller 50 is described in the flow diagram of FIGS. 5A and 5B, in combination with FIGS. 3 and 4. Initiation of food product bit processing and packaging begins at step 150. It is assumed that at step 150, while a bulk quantity of food product bits (not shown) has been provided to the supply device 24, the supply device 24 has not yet delivered any of the food product bits to the product separation and distribution apparatus 22. For example, where the supply device 24 is a conveyor, at step 150 food product bits can have been placed on the conveyor, but the conveyor will not yet have delivered any of the food product bits to the apparatus 22.

Figure 6:
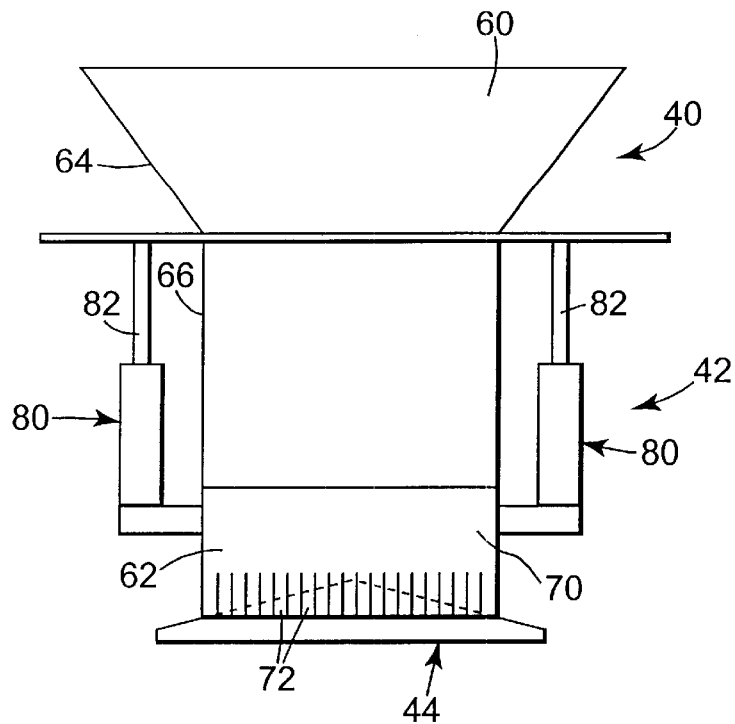
FIG. 6 is an enlarged, schematic, side view of a portion of the apparatus of FIG. 2 in a lowered position.

At step 152, the controller 50 signals the driving mechanism 42 to maneuver the inlet chute 40 to the lowered position. As a point of reference, FIG. 6 depicts the inlet chute 40 in the lowered position relative to the dispersion table 44. In this lowered position, the downstream end 62 of the inlet chute 40 contacts or is slightly spaced above the dispersion table 44. As previously described, in one preferred embodiment the inlet chute 40 includes the skirt 70 defining the flexible tabs 72 at the downstream end 62. By preferably employing a flexible or compliant material, the tabs 72 will readily deflect in a radial fashion along a surface of the dispersion table 44, thereby avoiding damage to the dispersion table 44.

Returning to FIG. 5, at step 154, the controller 50 activates the supply device 24 to provide food product bits to the inlet chute 40. For example, where the supply device 24 is a conveyor, the controller 50 initiates movement of the conveyor that in turn distributes food product bits in a continuous stream to the inlet chute 40.

Figure 7:
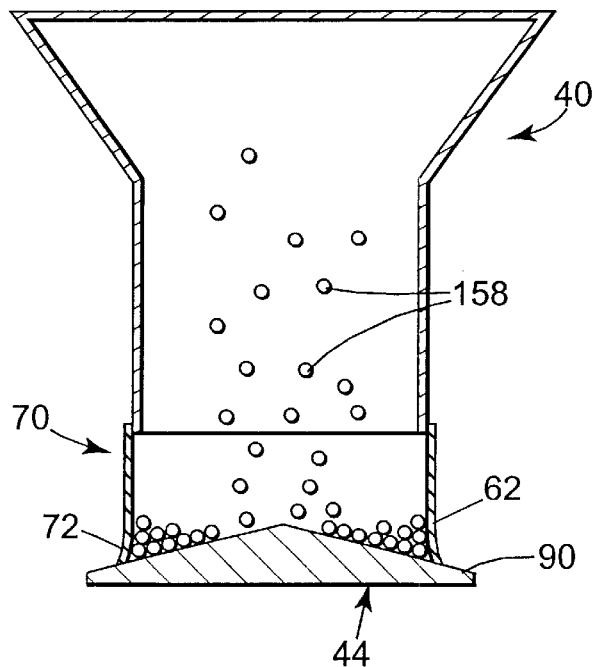
FIG. 7 is an enlarged, side-sectional view of FIG. 6.
Figure 8:
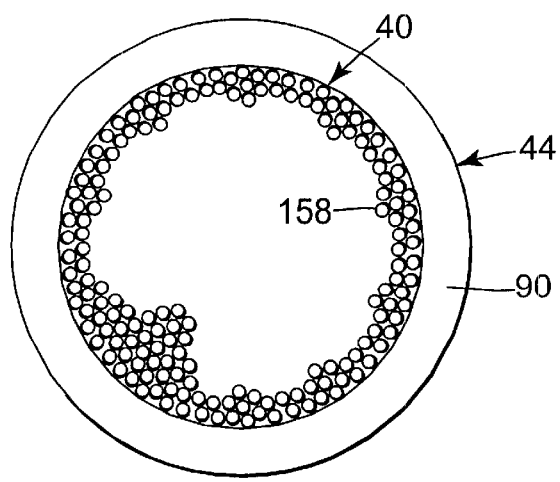
FIG. 8 is a top view of the apparatus of FIG. 6, including food product bits accumulated on a dispersion table.

At step 156, the food product bits are directed through the inlet chute 40 to the dispersion table 44. In this regard, the downstream end 62 of the inlet chute 40 forces the food product bits to accumulate on the dispersion table 44. For example, as shown in FIG. 7, as the food product bits (represented generally at 158) are directed through the inlet chute 40 onto the dispersion table 44, the convex shape of the dispersion table 44 causes the food product bits 158 to naturally move radially outwardly along the dispersion table 44 toward the perimeter 90. Because the downstream end 62 of the inlet chute 40 is in contact with, or slightly spaced from the dispersion table 44, the downstream end 62 impedes release of the food product bits 158 from the dispersion table 44. In this regard, where the inlet chute 40 includes the skirt 70 and the flexible tabs 72, the flexible tabs 72 preferably exhibits sufficient rigidity to effectuate the above-described accumulation of food product bits 158. Over time, as additional food product bits 158 are continuously supplied to the inlet chute 40, the downstream end 62 creates a relatively uniform or even distribution of the food product bits 158 across the dispersion table 44 relative to the perimeter 90. An exemplary illustration of this distribution is provided in FIG. 8. Thus, while the particular type of food product bit might otherwise exhibit a natural affinity fall toward one particular location of the dispersion table 44 (such as with a sticky food product), the lowered position of the inlet chute 40 effectively overcomes this natural affinity, producing the desired relatively uniform distribution. In other words, while the food product bits 158 may initially fall toward one dispersion table 44 perimeter location or locations, the forced accumulation caused by the inlet chute 40 causes at least some of the food product bits 158 to "spill over" to remaining areas of the dispersion table 44, as shown in FIG. 8. In this regard, the vibration unit 92 (FIG. 3) can to promote a more uniform distribution.

Returning to FIG. 5, at step 160 as the food product bits 158 accumulate on the dispersion table 44, the controller 50 monitors the food product bit weight on the dispersion table 44 via the load cell 100. At step 162, the controller 50 periodically or continuously compares the detected food product bit weight to a predetermined upper reference value. The predetermined upper reference value bears a known relation to a general weight associated with each of the individual food product bits 158 as well as to a surface area of the dispersion table 44. With this in mind, the upper reference value is a calculated weight at which enough of the food product bits 158 have accumulated on the dispersion table 44 to adequately supply the various product batch handling units 46. For example, the food product bits 158 can be gelatin-based food bits, such as fruit snacks, each having a weight of approximately 3 grams. Based upon this weight and a diameter of the dispersion table 44, it may further be determined that at least 300 grams of the food product bits 158 are necessary to properly supply all of the product batch handling units 46. With this example, then, a predetermined upper value of 300 grams can be established with the controller 50.

If it is determined at step 164 that the detected food product bit weight does not equal or exceed the predetermined upper value (NO in step 164), the controller 50 allows the supply device 24 to continue providing food product bits to the inlet chute 40. Thus, the food product bits 158 continue to accumulate on the dispersion table 44. If the answer is YES at step 164, the method proceeds to step 166 at which the controller 150 signals the supply device 24 to stop the supply of food product bits 158. For example, where the supply device 24 is a conveyor, the controller 50 deactivates the conveyor.

In one preferred embodiment, following cessation of the stream of food product bits 158, the controller 50 waits a short time period before carrying out subsequent operations at step 160. To this end, the timer 140 provides the controller 150 with a time or counting signal. The time period associated with the delay of step 168 allows the food product bits 158 otherwise disposed on the dispersion table 44 to more evenly distribute relative to the perimeter 90. In one preferred embodiment, the delay is approximately 1–3 seconds, although other time periods are equally acceptable.

Figure 9:
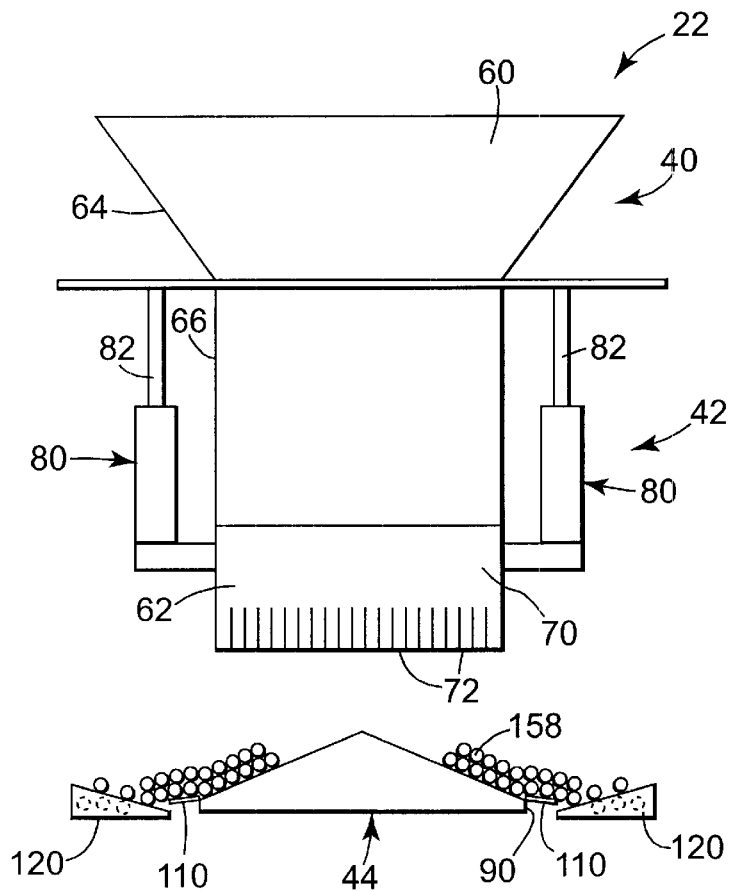
FIG. 9 is an enlarged, schematic, side view of a portion of the apparatus of FIG. 2 in a raised position.

At step 170, the controller 50 signals the driving mechanism 42 to raise the inlet chute 40 to the raised position. An example of the raised position is illustrated in FIG. 9. In the raised position, sufficient spacing is provided to allow the food product bits 158 to freely flow from the dispersion table 44 to the product batch handling units 46 (such as the radial troughs 120) at step 172. As previously described, during the accumulation process, the food product bits 158 will have been relatively uniformly dispersed along the dispersion table 44 relative to the perimeter 90. Thus, each of the radial troughs 120 will receive a quantity of the food product bits 158. Notably, the fingers 110 guide the food product bits 158 to the radial troughs 120, and prevent undesirable "back flow" to the dispersion table 44. In direct contrast, prior art combination weighing machines handling relatively sticky food product bits and/or operating in a high humidity environment will consistently feed only a few of the product batch handling units 46, resulting in diminished production rates. By consistently supplying all of the radial troughs 120 (and thus all of the product batch handling units 46) with quantities of the food product bits 158, subsequent operations of the apparatus 22 will be optimally performed.

At step 174, the controller 50 receives a signal from the load cell 100 indicative of a weight of food product bits 158 on the dispersion table 44. The controller 50 periodically or continuously compares the detected weight to a predetermined lower reference value. The predetermined lower reference value is indicative of all, or substantially all, of the food product bits 158 having been dispersed from the dispersion table 44 to the radial troughs 120. So as to accommodate fluctuations in scale accuracy, as well as to facilitate a more rapid cycle time, the predetermined lower reference value is preferably set at a number slightly greater than zero.

If it is determined at step 176 that the detected weight is not less than or equal to the predetermined lower value (NO at step 176), the controller 50 maintains the inlet chute 40 in the raised position, allowing for further food product bit dispersion. If the answer is YES at step 176, the controller 50 signals the driving mechanism 42 to maneuver the inlet chute 40 to the lowered position at step 178. Once in the lowered position, the controller 50 activates the supply device 24 at step 180. Following activation of the supply device 24, the entire process, beginning at step 156 is repeated, with additional quantities of the food product bits 158 accumulating on the dispersion table 44 in a relatively uniform fashion for subsequent supply to the radial troughs 120.

Operation of a remainder of the product handling and distribution apparatus 22 via the product batch handling units 46 can very widely, but results in appropriately weighted charges of the food product bits 158 being supplied to the packager 26. In general terms, and with reference to FIG. 2, the radial troughs 120 receive vibration from the radial feeders 122 and convey the food product bits 158 (FIG. 7) otherwise received from the dispersion table 144 to the pool hoppers 124. Each of the pool hoppers 124 temporarily store the received food product bits 158 in synchronization with product weighing. More particularly, the pool hoppers 124 are signaled by the controller 50 to discharged stored food product to the respective weigh hoppers 126 as required. The weigh hoppers 126, in turn, temporarily store and weigh the food product bits 158 accumulated therein. The controller 50 preferably includes a calculation unit that selects an optimum combination of food product bits 158 otherwise stored in one or more of the weigh hoppers 126. Based upon the selection, the food product bits 158 are discharged from the selected weigh hoppers 126 to the discharge chute 148 and thus to the packager 26.

The apparatus, system and method of the present invention provides a marked improvement over previous designs. In particular the present invention optimizes combination weighing-type machine operation by facilitating uniform food product bit distribution to all product batch handling units associated with the machine. First, the inlet chute is specifically configured to be maneuverable to a lowered position in which forced, uniform accumulation of food product bits on the dispersion table occurs. Further, the controller system and related handling process ensures rapid cycle times with minimal interruptions. Thus, the present invention is, unlike previous embodiments, able to optimally process all types of food product bits, especially gelatin-based products such as fruit snacks, under all operating environmental conditions.

Although the present invention has been described with reference to preferred embodiments, workers skilled in the art will recognize that changes can be made in form and detail without departing from the spirit and scope and the present invention.

What is claimed is:

1. An apparatus for distributing food product bits provided in bulk form from a supply device to a packager, the apparatus comprising:

an inlet chute for receiving a stream of food product bits, the inlet chute defining an upstream end and a downstream end;

a plurality of flexible tabs extending downwardly at the downstream end of the inlet chute.

a dispersion table positioned below the downstream end of the inlet chute;

a driving mechanism coupled to the inlet chute, the driving mechanism configured to selectively raise and lower the inlet chute relative to the dispersion table;

a plurality of radial troughs equidistantly spaced adjacent a perimeter of the dispersion table to receive food product bits from the dispersion table;

a plurality of pool hoppers associated with respective ones of the plurality of radial troughs to accumulate food product bits from the plurality of radial troughs;

a plurality of weigh hoppers associated with respective ones of the plurality of pool hoppers to accumulate and weigh food product bits delivered from the plurality of pool hoppers; and a discharge chute associated with the plurality of weigh hoppers for distributing food product bits from the plurality of weigh hoppers to a packager.

2. The apparatus of claim 1, wherein the plurality of flexible tabs are rubber.

3. The apparatus of claim 1, wherein the inlet chute is configured to be movable to a lowered position in which trailing ends of the flexible tabs are adjacent the dispersion table, and further wherein the plurality of flexible tabs are configured to have a rigidity sufficient to impede release of food product bits from the dispersion table in the lowered position.

4. The apparatus of claim 3, wherein the rigidity of the flexible tabs is sufficient to impede release of a plurality of gelatin-based food snack bits from the dispersion table.

5. An apparatus for distributing food product bits provided in bulk form from a supply device to a packager, the apparatus comprising:

an inlet chute for receiving a stream of food product bits, the inlet chute defining an upstream end and a downstream end;

a dispersion table positioned below the downstream end of the inlet chute;

a driving mechanism coupled to the inlet chute, the driving mechanism configured to selectively raise and lower the inlet chute relative to the dispersion table;

a plurality of radial troughs equidistantly spaced adjacent a perimeter of the dispersion table to receive food product bits from the dispersion table;

a plurality of fingers extending from a perimeter of the dispersion table into respective ones of the plurality of radial troughs, the plurality of fingers configured to guide food product bits into the plurality of radial troughs;

a plurality of pool hoppers associated with respective ones of the plurality of radial troughs to accumulate food product bits from the plurality of radial troughs;

a plurality of weigh hoppers associated with respective ones of the plurality of pool hoppers to accumulate and weigh food product bits delivered from the plurality of pool hoppers; and a discharge chute associated with the plurality of weigh hoppers for distributing food product bits from the plurality of weigh hoppers to a packager.

6. The apparatus of claim 5, wherein the plurality of fingers are rubber.

7. An apparatus for distributing food product bits provided in bulk form from a supply device to a packager, the apparatus comprising:

an inlet chute for receiving a stream of food product bits, the inlet chute defining an upstream end and a downstream end;

a dispersion table positioned below the downstream end of the inlet chute;

a weigh device associated with the dispersion table for detecting a weight of food product bits disposed in the dispersion table;

a driving mechanism coupled to the inlet chute, the driving mechanism configured to selectively raise and lower the inlet chute relative to the dispersion table;

a plurality of radial troughs equidistantly spaced adjacent a perimeter of the dispersion table to receive food product bits from the dispersion table;

a plurality of pool hoppers associated with respective ones of the plurality of radial troughs to accumulate food product bits from the plurality of radial troughs;

a plurality of weigh hoppers associated with respective ones of the plurality of pool hoppers to accumulate and weigh food product bits delivered from the plurality of pool hoppers and;

a discharge chute associated with the plurality of weigh hoppers for distributing food product bits from the plurality of weigh hoppers to a packager.

8. An apparatus for distributing food product bits provided in bulk form from a supply device to a packager, the apparatus comprising:

an inlet chute for receiving a stream of food product bits, the inlet chute defining an upstream end and a downstream end;

a dispersion table positioned below the downstream end of the inlet chute;

a driving mechanism coupled to the inlet chute, the driving mechanism configured to selectively raise and lower the inlet chute relative to the dispersion table;

a controller associated with the driving mechanism for dictecting a position of the driving mechanism;

a plurality of radial troughs equidistantly spaced adjacent a perimeter of the dispersion table to receive food product bits from the dispersion table;

a plurality of pool hoppers associated with respective ones of the plurality of radial troughs to accumulate food product bits from the plurality of radial troughs;

a plurality of weigh hoppers associated with respective ones of the plurality of pool hoppers to accumulate and weigh food product bits delivered from the plurality of pool hoppers; and a discharge chute associated with the plurality of weigh hoppers for distributing food product bits from the plurality of weigh hoppers to a packager.

9. The apparatus of claim 8, wherein the controller is further connected to the supply device for controlling activation of the supply device.

10. A food product bit distribution system comprising:

an inlet chute that receives a stream of food product bits from a conveyor, the inlet chute defining an upstream end and a downstream end;

a dispersion table positioned below the inlet chute to receive food product bits from the inlet chute, wherein the inlet chute is vertically movable relative to the dispersion table;

product batch handling units that receive, accumulate, and selectively dispense food product bits from the dispersion table;

a discharge chute that directs food product bits from the product batch handling units to a packager; and a controller that controls activation of the conveyor and that controls a vertical position of the inlet chute relative to the dispersion table between a lowered position in which food product bits accumulate on the dispersion table, and a raised position in which food product bits freely flow from the dispersion table, wherein the controller activates the conveyor based upon a vertical position of the inlet chute relative to the dispersion table.

11. The system of claim 10, wherein the controller activates the conveyor when the inlet chute is in the lowered position, and deactivates the conveyor when the inlet chute is in the raised position.

12. A food product bit distribution system comprising:
   an inlet chute that receives a stream of food product bits, the inlet chute defining an upstream end and a downstream end;
   a dispersion table positioned below the inlet chute to receive food product bits from the inlet chute, wherein the inlet chute is vertically movable relative to the dispersion table;
   product batch handling units that receive, accumulate, and selectively dispense food product bits from the dispersion table;
   a discharge chute that directs food product bits from the product batch handling units to a packager; and
   a controller that controls a vertical position of the inlet chute relative to the dispersion table between a lowered position in which food product bits accumulate on the dispersion table, and a raised position in which food product bits freely flow from the dispersion table, wherein the controller controls the vertical position of the inlet chute relative to the dispersion table based upon a weight of food product bits on the dispersion table.

13. The system of claim 12, further comprising:
   a weigh sensor associated with the dispersion table that senses a weight of food product bits on the dispersion table.

14. The system of claim 13, wherein the weigh sensor delivers a signal to the controller indicative of food product bit weight.

15. The system of claim 12, wherein the controller maintains the downstream end of the inlet chute in the lowered position as food product bits accumulate on the dispersion table until an upper reference weight value is sensed.

16. The system of claim 15, wherein the controller maneuvers the inlet chute to the raised position after the upper reference weight value is sensed to allow food product bits to be dispersed from the disbursement table to the product batch handling units.

17. The system of claim 15, further comprising:
   a timer associated with the controller, wherein the controller maintains the inlet chute in the lowered position after the upper reference weight value has been achieved for a time period dictated by the timer.

18. The system of claim 12, wherein the controller maintains the inlet chute in the raised position as food product bits flows from the dispersion table until a lower reference value is sensed.

19. The system of claim 18, wherein the controller maneuvers the inlet chute to the lowered position after the lower reference weight value is sensed to allow food product bits to accumulate on the dispersion table.

20. A food product bit distribution system comprising:
   an inlet chute that receives a stream of food product bits, the inlet chute defining an upstream end and a downstream end;
   a dispersion table positioned below the inlet chute to receive food product bits from the inlet chute, wherein the inlet chute is vertically movable relative to the dispersion table;
   a plurality of radial troughs equidistantly spaced along a perimeter of the dispersion table to receive food product bits from the dispersion table;
   a plurality of fingers extending from a perimeter of the dispersion table into respective ones of the plurality of radial troughs, the plurality of fingers configured to guide food product bits into the plurality of radial troughs
   a plurality of pool hoppers associated with respective ones of the plurality of radial troughs to accumulate food product bits from the plurality of radial troughs;
   a plurality of weigh hoppers associated with respective ones of the plurality of pool hoppers for accumulating and weighing food product bits delivered from the plurality of pool hoppers;
   a discharge chute that directs food product bits from the product batch handling units to a packager; and
   a controller that controls a vertical position of the inlet chute relative to the dispersion table between a lowered position in which food product bits accumulate on the dispersion table, and a raised position in which food product bits freely flow from the dispersion table.

21. A food product bit distribution system comprising:
   an inlet chute that receives a stream of food product bits, the inlet chute defining an upstream end and a downstream end;
   a plurality of flexible tabs extending from the downstream end of the inlet chute;
   a dispersion table positioned below the inlet chute to receive food product bits from the inlet chute, wherein the inlet chute is vertically movable relative to the dispersion table;
   product batch handling units that receive, accumulate, and selectively dispense food product bits from the dispersion table;
   a discharge chute that directs food product bits from the product batch handling units to a packager, and
   a controller that controls a vertical position of the inlet chute relative to the dispersion table between a lowered position in which food product bits accumulate on the dispersion table, and a raised position in which food bits freely flow from the dispersion table.

22. The system of claim 21, wherein the plurality of flexible tabs are rubber.

23. The system of claim 21, wherein the inlet chute is configured to be movable to a lowered position in which trailing ends of the flexible tabs are adjacent the dispersion table, and further wherein the plurality of flexible tabs are configured to have a rigidity sufficient to impede release of food product bits from the dispersion table in the lowered position.

24. A method of distributing a stream of food product bits to a packager with a product distribution apparatus, the product distribution apparatus including an inlet chute for receiving the stream of food product bits, a dispersion table positioned below the inlet chute, a plurality of batch handling units for receiving, accumulating, weighing, and selectively dispensing food product bits from the dispersion table, and a discharge chute for directing food product bits from the batch handling units to the packager, the method comprising:
   movably associating the inlet chute relative to the table such that the inlet chute is movable between a lowered position in which the inlet chute forces food product bits to accumulate the dispersion table and a raised position in which food product bits freely flow from the dispersion table;
   maneuvering the inlet chute to the lowered position;

accumulating food product bits on the dispersion table;

detecting a food product bit weight on a dispersion table;

maneuvering the inlet chute to the raised position to release the accumulated food product bits; and selectively processing the food product bits through the batch handling units and the discharge chute to the packager.

25. The method of claim 24, further comprising:

maintaining the inlet chute in the lowered position until a predetermined food product bit weight on the dispersion table is detected.

26. The method of claim 24, wherein a conveyor provides the food product bit stream to the inlet chute, the method further comprising:

deactivating the conveyor once a predetermined food product bit weight on the dispersion table is detected.

27. The method of claim 26, further comprising:

returning the inlet chute to the lowered position following release of the accumulated food product bits.

28. The method of claim 27, further comprising:

activating the conveyor after returning the inlet chute to the lowered position.

29. The method of claim 27, wherein returning the inlet chute to the lowered position includes:

determining whether the detected food product bit weight on the dispersion table is less than a predetermined value.

30. The method of claim 26, further comprising:

delaying movement of the inlet chute to the raised position for a predetermined time period following deactivation of the conveyor.

31. A method of distributing a stream of food product bits to a packager with a product distribution apparatus, the product distribution apparatus including an inlet chute for receiving the stream of food product bits, a dispersion table positioned below the inlet chute, wherein the inlet chute defines an upstream end and a downstream end, the downstream end being proximal the dispersion table, a plurality of batch handling units for receiving, accumulating, weighing, and selectively dispensing food product bits from the dispersion table, and a discharge chute for directing food product bits from the batch handling units to the packager, the method comprising:

movably associating the inlet chute relative to the table such that the inlet chute is movable between a lowered position in which the inlet chute forces food product bits to accumulate the dispersion table and a raised position in which food product bits freely flow from the dispersion table;

extending a plurality of flexible tabs downwardly from the downstream end for preventing release of food product bits from the dispersion table in the lowered position;

maneuvering the inlet chute to the lowered position;

accumulating food product bits on the dispersion table;

maneuvering the inlet chute to the raised position to release the accumulated food product bits; and selectively processing the food product bits through the batch handling units and the discharge chute to the packager.

* * * * *